United States Patent
Dhawan et al.

(10) Patent No.: US 8,079,054 B1
(45) Date of Patent: Dec. 13, 2011

(54) LOCATION FOR SECONDARY CONTENT BASED ON DATA DIFFERENTIAL

(75) Inventors: Anmol Dhawan, Ghaziabad (IN); Sachin Soni, Delhi (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 684 days.

(21) Appl. No.: 12/102,194

(22) Filed: Apr. 14, 2008

(51) Int. Cl.
*H04N 7/173* (2011.01)
*H04N 7/025* (2006.01)
*H04N 5/445* (2011.01)
*G06Q 30/00* (2006.01)

(52) U.S. Cl. ............ 725/105; 725/32; 725/34; 725/36; 725/46; 705/14.4; 705/14.41; 705/14.49; 705/14.53; 705/14.6

(58) Field of Classification Search .............. 725/32, 725/34–36, 109, 110, 112; 705/14, 14.4, 705/14.41, 14.49, 14.53, 14.6, 14.66, 14.67
See application file for complete search history.

(56) References Cited

U.S. PATENT DOCUMENTS

| | | | | |
|---|---|---|---|---|
| 5,818,439 A | * | 10/1998 | Nagasaka et al. | 725/87 |
| 5,886,731 A | * | 3/1999 | Ebisawa | 725/32 |
| 6,006,265 A | * | 12/1999 | Rangan et al. | 709/226 |
| 6,144,375 A | * | 11/2000 | Jain et al. | 715/251 |
| 6,357,042 B2 | * | 3/2002 | Srinivasan et al. | 725/32 |
| 6,601,103 B1 | * | 7/2003 | Goldschmidt Iki et al. | 709/231 |
| 6,637,032 B1 | * | 10/2003 | Feinleib | 725/110 |
| 6,698,020 B1 | * | 2/2004 | Zigmond et al. | 725/34 |
| 6,750,919 B1 | * | 6/2004 | Rosser | 348/584 |
| 6,882,793 B1 | * | 4/2005 | Fu et al. | 386/95 |
| 7,079,176 B1 | * | 7/2006 | Freeman et al. | 348/207.1 |
| 7,444,659 B2 | * | 10/2008 | Lemmons | 725/34 |
| 7,779,438 B2 | * | 8/2010 | Davies | 725/32 |
| 7,788,686 B1 | * | 8/2010 | Andrews | 725/32 |
| 2002/0087969 A1 | * | 7/2002 | Brunheroto et al. | 725/13 |
| 2002/0144262 A1 | * | 10/2002 | Plotnick et al. | 725/32 |
| 2004/0034874 A1 | * | 2/2004 | Hord et al. | 725/136 |
| 2004/0221311 A1 | * | 11/2004 | Dow et al. | 725/52 |
| 2005/0289583 A1 | * | 12/2005 | Chiu | 725/22 |
| 2007/0203942 A1 | * | 8/2007 | Hua et al. | 707/104.1 |
| 2007/0204310 A1 | * | 8/2007 | Hua et al. | 725/88 |
| 2008/0229357 A1 | * | 9/2008 | Candelore et al. | 725/40 |
| 2009/0132355 A1 | * | 5/2009 | Begeja et al. | 705/14 |

\* cited by examiner

*Primary Examiner* — Son P Huynh
(74) *Attorney, Agent, or Firm* — Kilpatrick Townsend & Stockton LLP

(57) ABSTRACT

Methods and apparatus provide for a Content Inserter to determine location(s) for secondary content in streaming video. The Content Inserter receives a set of video frames and analyzes data differential(s) occurring in the set of video frames to identify secondary content locations between adjacent video frames. The Content Inserter inserts secondary content at the location(s) for secondary content. A data differential can be a change in subtitle information between video frames, a change in audio data between video frames, a difference in content ratings between regions of video frames, and/or difference in activity levels between regions of video frames. Activity levels correspond to changes in pixel color data of video frames. Thus, the Content Inserter identifies secondary content locations based on characteristics of each video stream and ensures that inserted secondary content is placed in a video stream so that the secondary content will most likely be viewed.

23 Claims, 12 Drawing Sheets

LOCATION FOR SECONDARY CONTENT BASED ON DATA DIFFERENTIAL

BACKGROUND

Streaming media is media that is constantly received by, and normally displayed to, an end-user while it is being delivered by the provider. The name refers to the delivery method of the medium rather than to the medium itself. The distinction is usually applied to media that are distributed over telecommunications networks, as most other delivery systems are either inherently streaming (e.g. radio, television) or inherently non-streaming (e.g. books, video cassettes, audio CDs).

Streaming media is a sequence of media (such as video frames) sent in compressed form over the Internet and displayed in a media player as the media is received. With streaming video or streaming media, a Web user does not have to wait to download a large file before experiencing the streaming media. Instead, the media is sent in a continuous stream and is played as it arrives. The user needs a media player which is a software application that decompresses and processes the media data for playback. A player can be either an integral part of a browser or downloaded from a Web site.

Streaming video is a form of streaming media that is usually sent from prerecorded video files, but can be distributed as part of a live broadcast "feed." In order to provide free content via streaming video, content providers insert paid advertisements throughout the streaming video.

SUMMARY

Conventional computer systems suffer from a variety of deficiencies. For example, the insertion of advertisements into streaming video is standardized. Thus, where an advertisement is to occur in a stream of video frames is independent of the content presented in the video frames.

For example, instead of analyzing aspects of the content of a video stream, conventional systems rely on standard algorithms to determine the placement of advertisements in the video stream. Such standard algorithms determine locations for advertisements based on a time interval occurring in the stream of video, or by creating standardized partitions of the stream of video frames.

Such a conventional approach is deficient because the placement of advertisements is not relevant to the content of the video stream. By failing to consider aspects of the content being presented to a viewer, creating a standardized placement of an advertisement in a video stream can minimize the effectiveness of the advertisement when its placement does not correlate to moments in the video stream's content when a viewer is most likely attentive.

Techniques discussed herein significantly overcome the deficiencies of conventional applications such as those discussed above as well as additional techniques also known in the prior art. As will be discussed further, certain specific embodiments herein are directed to a Content Inserter. The one or more embodiments of the Content Inserter as described herein contrast with conventional systems to allow for determining a location(s) in a video stream for secondary content based on characteristics of a video stream. By analyzing metadata, subtitle information, audio data, content ratings and/or pixel color data related to the video frames in streaming video, the Content Inserter determines locations for secondary content that correlate to moments in the video stream's content that capture a viewer's attention. Thus, by inserting secondary content (e.g. advertisements) with respect to moments in the video stream's content that capture the viewer's attention, the Content Inserter identifies locations in video where a viewer will most likely be willing to actually view the secondary content.

For example, in one embodiment, where the stream of video (i.e. a set of video frames) presents a sporting event, each video frame can have corresponding subtitle information and audio data. The subtitle information contains data about the score between the opponents in the sporting event. The Content Inserter analyzes the subtitle information to determine where changes occur in the subtitle information, such changes representing moments in the sporting event where the score is updated. The Content Inserter inserts secondary content (such as advertisements) between video frames where the score change occurs. By determining the secondary content locations with respect to changes in subtitle information (such as the score change), it is probable that a viewer will see the secondary content since most viewers of sporting events are likely to pay attention to moments where the score changes.

In another embodiment, rather than relying on changes in subtitle information, the Content Inserter analyzes changes in audio data that corresponds to each video frame of the sporting event's streaming video. If the Content Inserter determines that a change in audio data for a plurality of video frames is greater than a threshold level, then change in audio data most likely represents the sporting event's spectators reacting to an exciting moment in the sporting event—such as a change in the score, an argument with a referee, or a celebration. By determining the secondary content locations with respect to the change in audio data, it is probable that a viewer will see the secondary content since most viewers of the video stream are likely to pay attention to moments where the sporting event's spectators are reacting.

In another embodiment, each video frame in the streaming video can have a corresponding content rating. The content rating can reflect how past viewer's of the video stream reacted to or felt about the content of each video frame. Thus, those video frames with higher content rating most likely occur where the content of the video stream is most interesting or exciting. The Content Inserter partitions the video stream into multiple regions of video frames. For each region of video frames, the Content Inserter processes the content rating of each video frame in a given region to create that region's content rating density. The Content Inserter inserts secondary content (such as advertisements) between video frames that are located in regions of video frames with higher content rating densities. By determining the secondary content locations with respect to content ratings of video frames, it is probable that a viewer will see the secondary content since most viewers are likely to pay attention to moments in the video stream that other viewers found interesting and assigned a high content rating.

In yet another embodiment, each video frame in the streaming video can have a corresponding pixel color data. A difference in pixel color data between video frames suggests a certain amount of activity is represented in the video frames because the differences in pixel color data represent changes in imagery. The Content Inserter partitions the video stream into multiple regions of video frames. For each region of video frames, the Content Inserter processes differences in pixel color data between consecutive (i.e. adjacent) video frames in a given region to determine that region's activity level. The Content Inserter inserts secondary content (such as advertisements) between video frames that are located in regions of video frames with higher activity levels. By determining the secondary content locations with respect to activity levels of regions of video frames, it is probable that a viewer will see the secondary content since most viewers are likely to pay attention to moments in the video stream that portray a lot of activity.

Specifically, the Content Inserter receives a set of video frames and analyzes data differential(s) occurring in the set of video frames to identify secondary content locations between adjacent video frames. The Content Inserter inserts (e.g. associates) secondary content at the location(s) for secondary content. A data differential can be a change in subtitle information between video frames, a change in audio data between video frames, a difference in content ratings between regions of video frames, and/or difference in activity levels between regions of video frames. Activity levels correspond to changes in pixel color data of video frames. Thus, the Content Inserter identifies secondary content locations based on characteristics of each video stream and ensures that inserted secondary content is placed in a video stream so that the secondary content will most likely be viewed.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Content Inserter, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
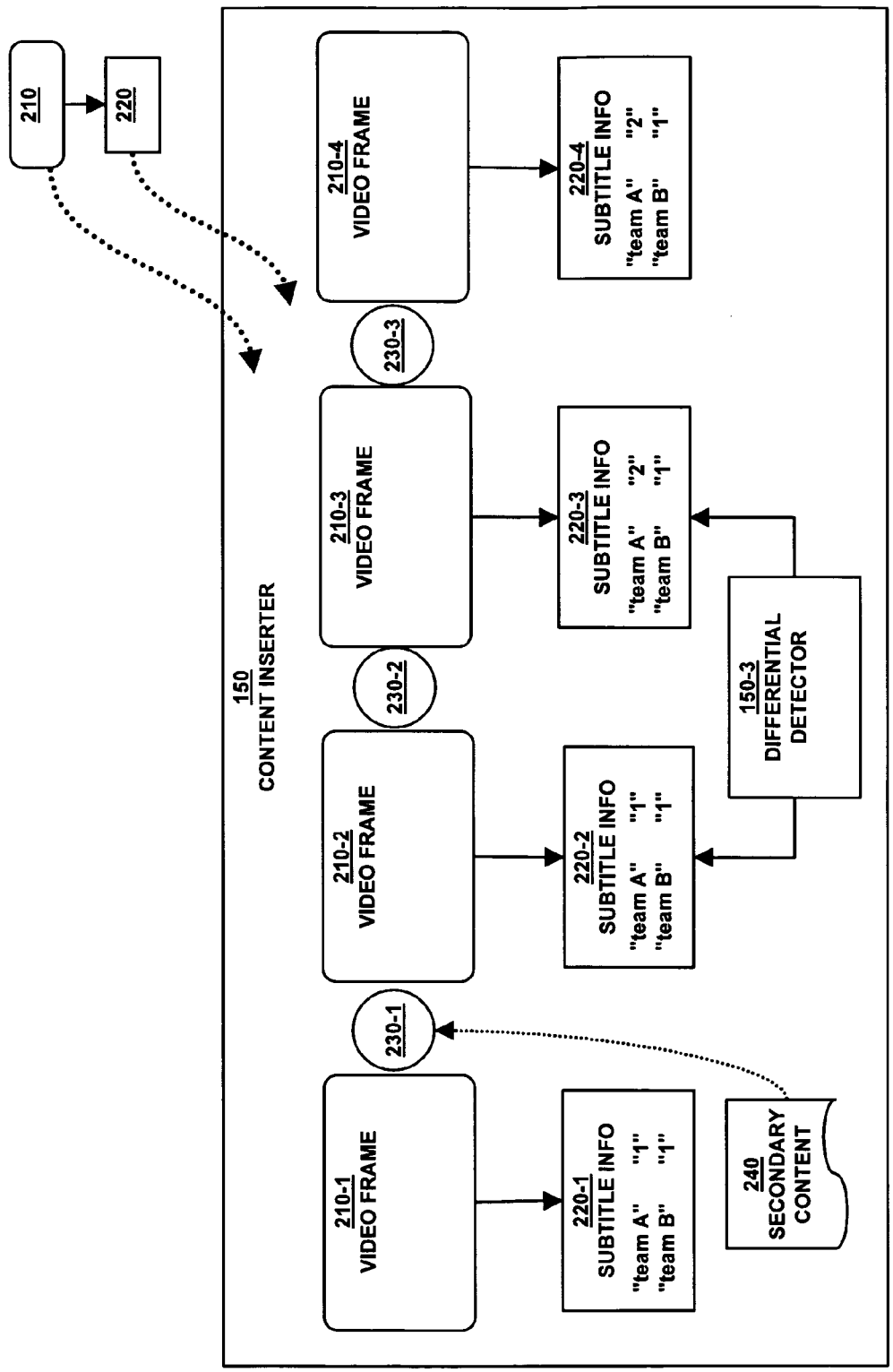
FIG. 1 is an example block diagram of a Content Inserter detecting a change in subtitle information according to embodiments herein.

Methods and apparatus provide for a Content Inserter 150 to determine location(s) for secondary content in streaming video. The Content Inserter 150 receives a set of video frames 210, 310, 410 and analyzes data differential(s) occurring in the set of video frames 210, 310, 410 to identify secondary content locations 230 between adjacent video frames. The Content Inserter 150 inserts secondary content 240 at the location(s) 230 for secondary content 240. A data differential can be a change in subtitle information 220 between video frames, a change in audio data between video frames, a difference in content ratings 320 between regions 330, 340, 350 of video frames, and/or difference in activity levels 440-1, 450-1, 460-1 between regions 440, 450, 460 of video frames. Activity levels 440-1, 450-1, 460-1 correspond to changes in pixel color data 420 of video frames. Thus, the Content Inserter 150 identifies secondary content locations 230 based on characteristics of each video stream and ensures that inserted secondary content 240 is placed in a video stream so that the secondary content 240 will most likely be viewed.

In one embodiment, secondary content 240 can be video advertisements streamed between two consecutive streaming video frames. For example, if a set of video frames includes 1000 video frames and the Content Inserter 150 identifies a secondary content location 230 right after the $400^{th}$ video frame, then a server streams the first 400 video frames and then streams a video advertisement after the $400^{th}$ video frame is streamed. When the server completes presentation of the video advertisement, the server returns to streaming the set of video frames at the $401^{st}$ video frame.

The server can identify the secondary content locations 230 as points in the set of video frames. Thus, if the secondary content 240 reside in independent files, the server can stream the secondary content 240 from their corresponding independent files when streaming of the video frames reaches each secondary content location 230. If the set of video frames represents a static video, the server can insert the secondary content 240 at the secondary content locations 230 into the static video itself.

Turning now to FIG. 1, FIG. 1 is an example block diagram of a Content Inserter 150 detecting a change in subtitle information 220 according to embodiments herein. The Content Inserter 150, which can be executed in a server, receives a set of video frames 210 and metadata, such as subtitle information 220. The set of video frames 210 can be a streaming media presentation (i.e. streaming video) of a sporting event. Each video frame 210-1, 210-2, 210-3, 210-4 has corresponding subtitle information 220-1, 220-2, 220-3, 220-4. The subtitle information 210-1, 210-2, 210-3, 210-4 can be information shown to a viewer that presents the up to date score of the sporting event. It is understood that the set of video frames 210 can include any number of video frames.

A differential detector 150-3 analyzes the subtitle information 220-1, 220-2, 220-3, 220-4 to identify differences between the subtitle information 220-1, 220-2, 220-3, 220-4. For example, the differential detector 150-3 detects no difference between the subtitle information 220-1, 220-2 associated with first two video frames 210-1, 210-2. Further, the differential detector 150-3 detects no difference between the subtitle information 220-3, 220-4 associated with last two video frames 210-3, 210-4.

However, the differential detector 150-3 detects a difference between the subtitle information 220-2, 220-3 associated with the second and third video frames 210-2, 210-3. The subtitle information 220-2 associated with the second video frame 210-2 includes information pertaining to a tied score where both "Team A" and "Team B" each have "1" point (or goal). The subtitle information 220-3 associated with the third video frame 210-3 includes information pertaining to an updated score where "Team A" has "2" points and "Team B" has "1" point. The Content Inserter 150 thereby identifies the change in the subtitle information 210-2, 210-3 between the second and third video frames 210-2, 210-3 as a moment in the content of the set of video frames 210 where the viewer would most likely be very attentive since something occurred in the sporting event that updated the score.

In order to take advantage of the viewer's probable attentiveness, the Content Inserter 150 identifies locations 230-1, 230-2, 230-3 for secondary content 240 (e.g. an advertisement, a commercial) with respect to the second and third video frames 210-2, 210-3. For example, a location 230-1 for secondary content 240 can be just prior to the second video frame 210-2 (i.e. in between the first and second video frames 210-1, 210-2). Another location 230-2 for secondary content 240 can be in between the second and third video frames 210-2, 210-3. In addition, for example, another location 230-3 for secondary content 240 can be just after the third video frame 210-3 (i.e. in between the third and fourth video frames 210-3, 210-4).

In an alternative embodiment, if the Content Inserter 150 identified locations for secondary content 240 in order to create a viewer experience without interruptions in the exciting moments of the content of the set of video frames 210, the Content Inserter 150 can analyze the subtitle information 220 as discussed above. To make sure the presentation of secondary content 240 does not occur when the score changes, the Content Inserter 150 can identify locations for secondary content 240 as occurring substantially before the second video frame 210-2 and/or substantially after the third video frame 230-3. Thus, the moment when the score changes in the sporting event is not interrupted by a presentation of secondary content 240.

In yet another embodiment, the Content Inserter 150 inserts the secondary content 240 at the locations 230 for secondary content positioned between two adjacent video frames in the set of video frames. For example, as the Content Inserter 150 streams the set of video frames 210 from a server to a client, the Content Inserter 150 can detect an upcoming position(s) of a secondary content location(s) 230. Without interrupting the streaming of the set of video frames 210, the Content Inserter 150 can transmit the secondary content 240 to a client along with the streaming set of video frames 210.

Upon detecting the upcoming position of a secondary content location 230, the Content Inserter 150 transmits the secondary content 240 to the client such that the secondary content 240 can be concurrently displayed at the client along with the streaming set of video frames 210. The Content Inserter 150 concurrently displays the secondary content 240 when the streaming set of video frames 210 reaches the location for secondary content 240 at the client.

Such concurrent display of the secondary content 240 at the client via transmission from the Content Inserter 150 includes a presentation of an icon, text, banner advertisement, and/or a graphic layered over the streaming set of video 210. In the alternative, the Content Inserter 150 can transmit the secondary content 240 such that it is displayed at the client in a pop-up window, at a particular position in the graphical user interface presenting the streaming set of video frames 210, and/or next to the graphical user interface presenting the streaming set of video frames 210.

Figure 2:
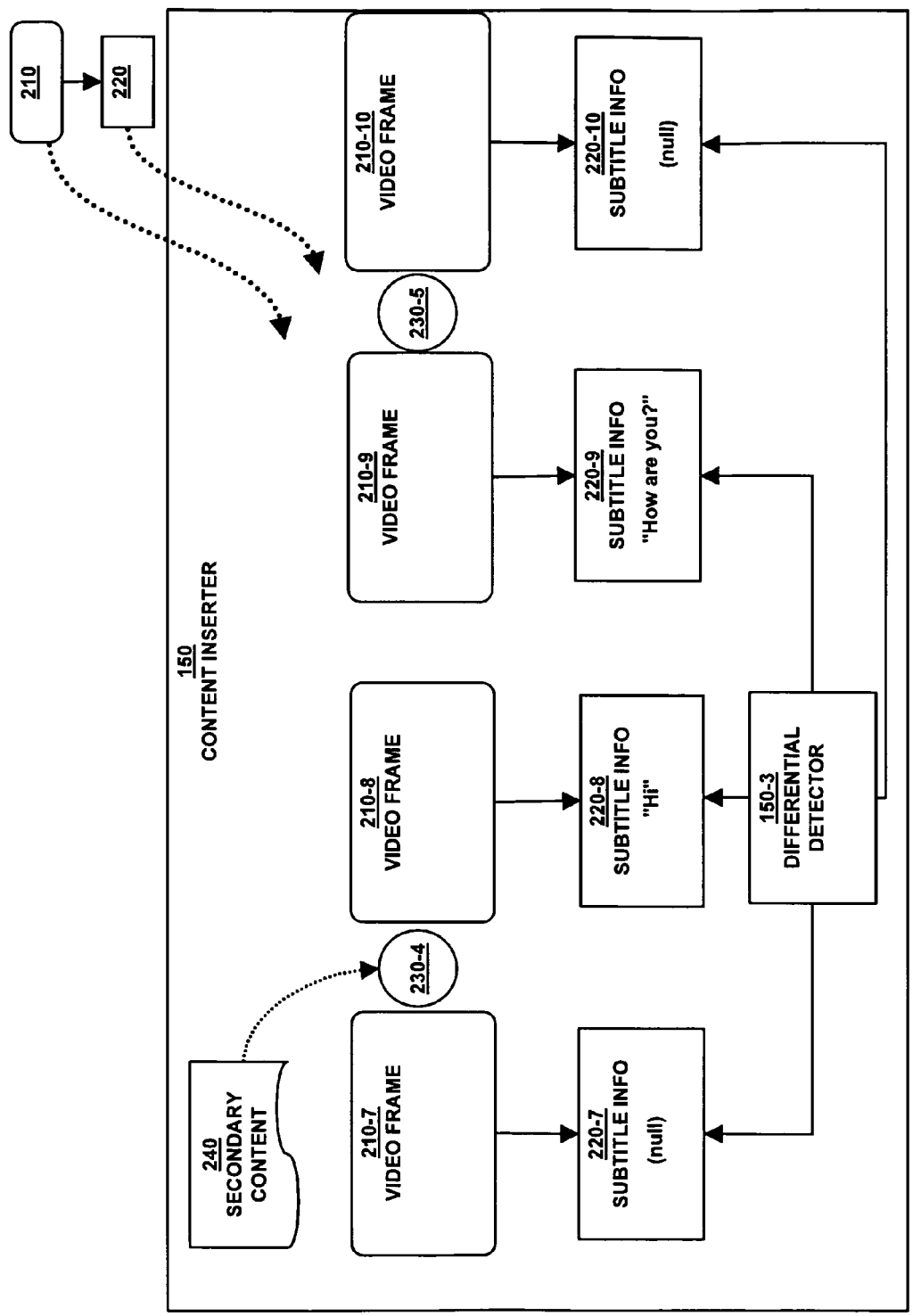
FIG. 2 is an example block diagram of a Content Inserter detecting a change in subtitle information according to embodiments herein.

FIG. 2 is an example block diagram of a Content Inserter 150 detecting a change in subtitle information 220 according to embodiments herein. The Content Inserter 150 receives a set of video frames 210 and metadata such as subtitle information 220. For purposes of FIG. 2, the set of video frames 210 can be a streaming media presentation of a fictional dramatic event (e.g. a movie scene). Each video frame 210-7, 210-8, 210-9, 210-10 has corresponding subtitle information 220-7, 220-8, 220-9, 220-10. The subtitle information 220-7, 220-8, 220-9, 220-10 can be information, presented during playback, that presents text of dialogue of the fictional dramatic event to the viewer. It is understood that the set of video frames 210 can include any number of video frames.

A differential detector 150-3 of the Content Inserter 150 analyzes the subtitle information 220-7, 220-8, 220-9, 220-10 to identify differences that occur in the subtitle information 220-7, 220-8, 220-9, 220-10. For example, the differential detector 150-3 determines when the presentation and termination of text of dialogue occurs. Thus, there is no difference between the subtitle information 220-8, 220-9 associated with the eighth and ninth video frames 210-8, 210-9 because the subtitle information 220-8, 220-9 for both vide frames 210-8, 210-9 include text of dialogue for both video frames 210-8, 210-9.

However, the differential detector 150-3 detects a difference between the subtitle information 220-7, 220-8 associated with the seventh and eighth video frames 210-7, 210-8. The subtitle information 220-7 associated with the seventh video frame 210-7 does not include any text of dialogue. The subtitle information 220-8 associated with the eighth video frame 210-8 includes text of dialogue (e.g. "Hi"). Thus, the differences in the subtitle information 220-7, 220-8 represents that a presentation of subtitle information 220 begins at the eighth video frame 220-8. The Content Inserter 150 thereby identifies the change in the subtitle information 210-7, 210-8 as a moment in the content of the set of video frames 210 where the viewer would most likely be very attentive since dialogue begins at the eighth video frame 220-8.

In addition, the differential detector 150-3 detects a difference between the subtitle information 220-9, 220-10 associated with the ninth and tenth video frames 210-9, 210-10. The subtitle information 220-10 associated with the tenth video frame 210-10 does not include any text of dialogue. The subtitle information 220-9 associated with the ninth video frame 210-9 includes text of dialogue (e.g. "How are you?"). Thus, the differences in the subtitle information 220-9, 220-10 represents that a presentation of subtitle information 220 terminates after at the ninth video frame 220-9. The Content Inserter 150 thereby identifies the change in the subtitle information 210-9, 210-10 as a moment in the content of the set of video frames 210 where the viewer would most likely be very attentive since dialogue ends at the eighth video frame 220-8.

In order to take advantage of the viewer's probable attentiveness, the Content Inserter 150 identifies locations 230-4, 230-5 for secondary content 240 (e.g. an advertisement, a commercial) with respect to the eighth and ninth video frames 210-8, 210-9. For example, a location 230-5 for secondary content 240 can be just after the ninth video frame 210-9. Thus, the dialogue is not interrupted by secondary content 240, but the presentation of secondary content 240 occurs at moments in the streaming video's content when the viewer is most likely to be attentive.

In an alternative embodiment, the Content Inserter 150 can process the amount of text of dialogue included in the subtitle information 220 to determine not only where presentation of text of dialogue begins and terminates, but also to determine video frames associated with the most text of dialogue. For example, the ninth video frame 210-9 has more subtitle information 220-9 than the subtitle information 220-8 of the eighth video frame 210-8. Thus, the ninth video frame 210-9 has a higher density of subtitle information. The Content Inserter 150 determines a location for secondary content 240 with respect to the ninth video frame 210-9 since the bulk of dialogue occurs at the ninth video frame 210-9.

Figure 3:
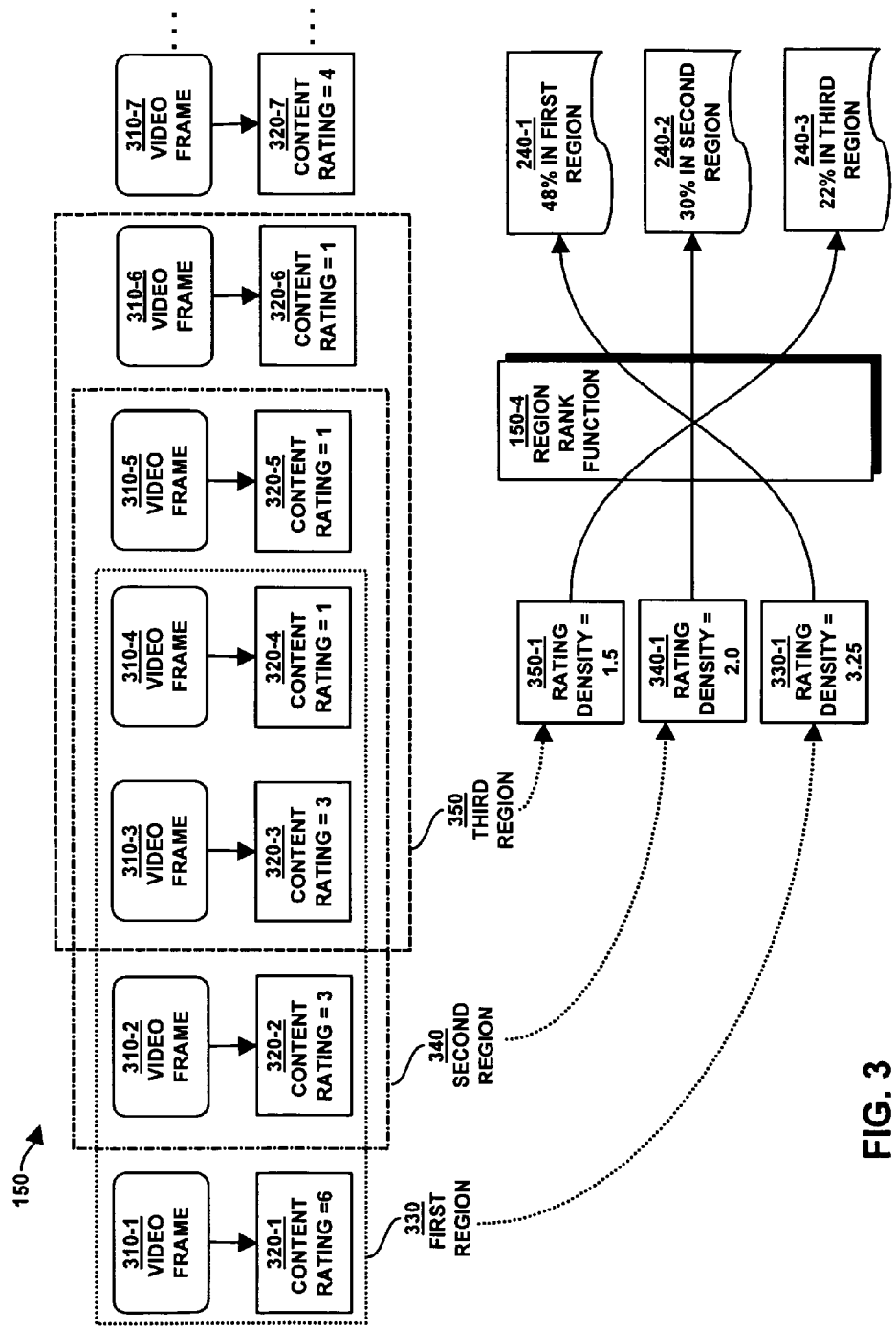
FIG. 3 is an example block diagram of a Content Inserter ranking aggregated content ratings from regions of video frames according to embodiments herein.

Regarding FIG. 3, FIG. 3 is an example block diagram of a Content Inserter 150 ranking aggregated content ratings 320 from regions 330, 340, 350 of video frames according to embodiments herein. The Content Inserter 150 receives a set of video frames 310 and each video frame is associated with a corresponding content rating 320. For example, the content ratings 320 can reflect how past viewer's of the video stream reacted to or felt about the content of each video frame. Thus, those video frames with higher content ratings 320 most likely occur where the content of the set of video frames 310 is most interesting or exciting.

The Content Inserter 150 partitions the set of video frames 310 into regions of video frames 330, 340, 350. Each region 330, 340, 350 has the same number of video frames, but no region of video frames 330, 340, 350 is the same. Thus, each region of video frames 330, 340, 350 includes a unique sequence of video frames. The first region 330 includes the first through fourth video frames 310-1, 310-2, 310-3, 310-4. The second region 340 includes the second through fifth video frames 310-2, 310-3, 310-4, 310-5. The third region 350 includes the third through sixth video frames 310-3, 310-4, 310-5, 310-6. It is understood that the Content Inserter 150 can partition the set of video frames 310 into any number of regions of video frames. It is further noted that the Content Inserter 150 can partition the set of video frames 310 such that every video frame is included in at least one region of video frames.

The Content Inserter 150 evaluates a difference of content ratings 320 between the regions of video frames 330, 340, 350. For each region of video frames 330, 340, 350, the Content Inserter 150 aggregates the content rating 320 of each video frame. For example, for the first region of video frames 330, the content ratings 320-1, 320-2, 320-3, 320-4 for the region's 330 four video frames 310-1, 310-2, 310-3, 310-4 are aggregated by the Content Inserter 150. For the second region of video frames 340, the content ratings 320-2, 320-3, 320-4, 320-5 for the region's 340 four video frames 310-2, 310-3, 310-4, 310-5 are aggregated by the Content Inserter 150. For the third region of video frames 350, the content ratings 320-3, 320-4, 320-5, 320-6 for the region's 350 four video frames 310-3, 310-4, 310-5, 310-6 are aggregated by the Content Inserter 150.

The Content Inserter 150 creates a rating density 330-1, 340-1, 350-1 for each region of video frames 330, 340, 350 by dividing each region's 330, 340, 350 corresponding aggregated content rating by the number of video frames (i.e. 4) included in each region 330, 340, 350. Upon creating the rating density 330-1, 340-1, 350-1 for each region of video frames 330, 340, 350, the Content Inserter 150 utilizes a region rank function 150-4 to create a ranking of each region 330, 340, 350 based on each region's 330, 340, 350 rating density 330-1, 340-1, 350-1. Thus, since the first region of video frames 330 has the highest rating density 330-1 (e.g. 3.25=(6+3+3+1)/4), the Content Inserter 150 determines the first region of video frames 330 as the highest ranked region. Since the second region of video frames 340 has the next-highest rating density 340-1 (e.g. 2.0=(3+3+1+1)/4), the Content Inserter 150 determines the second region of video frames 340 as the next-highest ranked region.

The Content Inserter 150 determines that a location for secondary content 240 can occur only in the highest-ranked region (i.e. the first region of video frames 330), only the lowest ranked region (i.e. the third region of video frames 350) or can proportionally distribute locations for secondary content 240 across all regions 330, 340, 350 according to their respective rating densities 330-1, 340-1, 350-1. Thus, the Content Inserter 150 creates enough locations for 48% of the secondary content 240-1 in the first region of video frames 330. The Content Inserter 150 also creates enough locations for 30% of the secondary content 240-2 in the second region of video frames 340. Additionally, the Content Inserter 150 creates enough locations for 22% of the secondary content 240-3 in the third region of video frames 350. The Content Inserter 150 thereby ensures that most of the secondary content 240-1 will be viewed by an attentive viewer since the secondary content 240-1 is inserted in between those video frames 310-1 . . . 310-4 that have the highest average content ranking 320.

In an alternative embodiment, the Content Inserter 150 proportionally distributes locations for secondary content 240 across all regions 330, 340, 350 in reverse according to their respective rating densities 330-1, 340-1, 350-1. Thus, the Content Inserter 150 creates the least amount of locations for secondary content 240 in the highest-ranked region of video frames (i.e. first region of video frames 330), and the most amount of locations for secondary content 240 in the lowest-ranked region of video frames (i.e. third region of video frames 350). The Content Inserter 150 thereby ensures that presentation of secondary content 240-1 will not interfere with an attentive viewer's enjoyment of those videos video frames 310-1 . . . 310-4 that have the highest average content ranking 320.

It is understood that the aspects of the Content Inserter 150 described in FIG. 3 can be applied in a similar manner to aggregate subtitle information of each video frame to determine a subtitle density for multiple regions of video frames. Thus, the Content Inserter 150 determines a subtitle density for each region of video frames and ranks the regions of video frames according to their respective subtitle densities. Based on the ranking of the subtitle densities, locations for secondary content 240 can distributed across the regions of video regions in proportion to their ranked subtitle densities. For example, if a video region has a highest ranked subtitle density of 3.0 and another video region has a subtitle density of 1.0, the highest ranked region receives 75% of the locations for secondary content 240 and the lower ranked region received 25% of the locations for secondary content.

Figure 4:
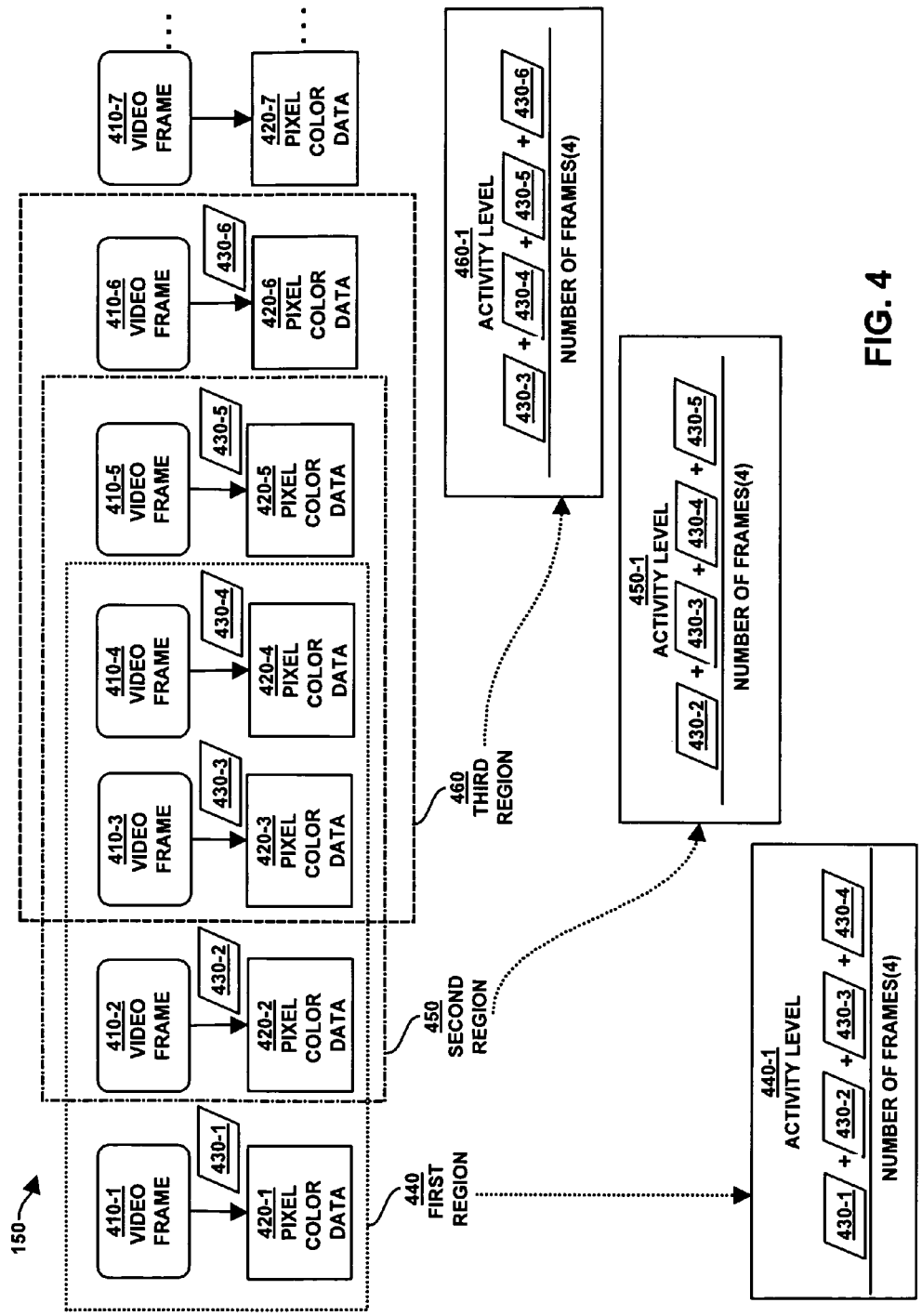
FIG. 4 is an example block diagram of a Content Inserter detecting activity levels in regions of video frames according to embodiments herein.

Referring now to FIG. 4, FIG. 4 is an example block diagram of a Content Inserter 150 detecting activity levels 440-1, 450-1, 460-1 in regions of video frames 440, 450, 460 according to embodiments herein. The Content Inserter 150 receives a set of video frames 410 and each video frame has associated pixel color data 420. For example, the pixel color data 430 represents each video frame as a matrix of pixels and each pixel has its own three color values for the colors red, blue, green. Thus, a difference 430 in pixel color data (i.e. a frame color differential) between video frames suggests a certain amount of visual activity is represented by the video frames because the difference 430 in pixel color data represents changes in imagery, or changes in each pixels' color values.

The Content Inserter 150 partitions the set of video frames 410 into regions of video frames 440, 450, 460. In each region 440, 450, 460, the Content Inserter 150 detects the difference 430 (i.e. a frame color differential) in color pixel data between each video frame and its preceding video frame. For example, in the first region of video frames 440, a difference 430-1 (i.e. a frame color differential) in color pixel data occurs between the first and second video frames 410-1, 410-2. Another difference 430-4 (i.e. a frame color differential) in color pixel data occurs between the fourth and fifth video frames 410-4, 410-5. As another example, in the third region of video frames 460, a difference 430-6 (i.e. a frame color differential) in color pixel data occurs between the sixth and seventh video frames 410-6, 410-7.

To determine an activity level 440-1, 450-1, 460-1 for each region of video frames 440, 450, 460, the Content Inserter 150 aggregates the frame color differentials 430-1 . . . 430-6 between each video frame and divides the frame color differential sum by the number of video frames in each region (e.g. 4). For example, to determine the activity level 440-1 for the first region of video frames 440, the frame color differentials 430-1, 430-2, 430-3, 430-4 are totaled. The Content Inserter 150 divides the sum of the four frame color differentials 430-1, 430-2, 430-3, 430-4 in the first region of video frames 440 by the number of video frames in the region 440.

To determine the activity level 450-1 for the second region of video frames 450, the frame color differentials 430-2, 430-3, 430-4, 430-5 are totaled. The Content Inserter 150 divides the sum of the four frame color differentials 430-2, 430-3, 430-4, 430-5 in the second region of video frames 450 by the number of video frames in the region 450.

In addition, to determine the activity level 460-1 for the third region of video frames 460, the frame color differentials 430-3, 430-4, 430-5, 430-6 are totaled. The Content Inserter 150 divides the sum of the four frame color differentials 430-3, 430-4, 430-5, 430-6 in the third region of video frames 460 by the number of video frames in the region 460.

For each region 440, 450, 460, the Content Inserter 150 determines if a region's 440, 450, 460 activity level 440-1, 450-1, 460-1 is greater than a threshold level. The Content Inserter 150 identifies a region 440, 450, 460 as suitable for a location(s) for secondary content 240 when its corresponding activity level 440-1, 450-1, 460-1 is greater than the threshold level. From those regions of video frames that the Content Inserter 150 identifies as suitable for a location(s) for secondary content 240, the Content Inserter 150 determines the location(s) for secondary content occurs in the region of video frames with a maximum activity level.

Figure 5:
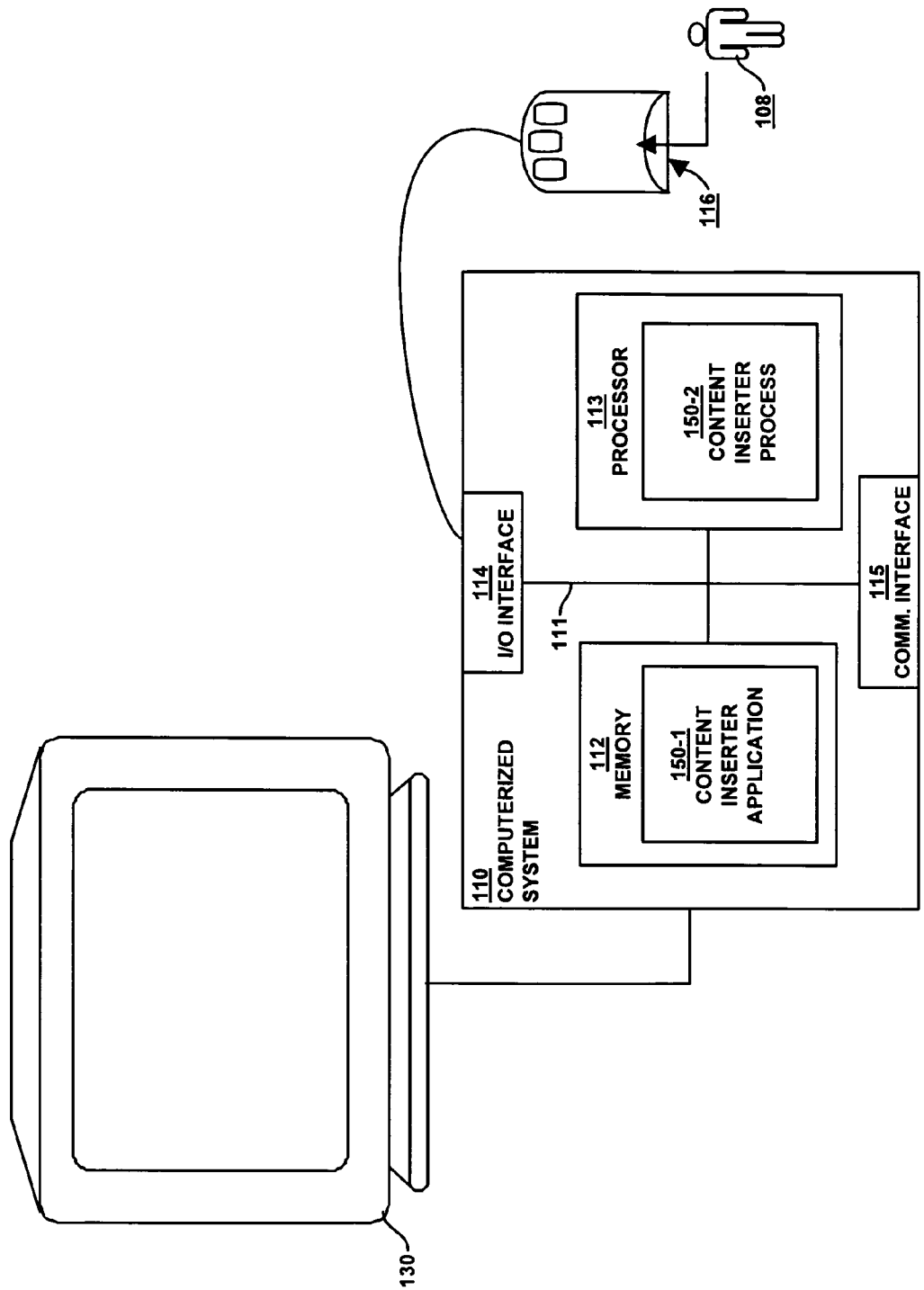
FIG. 5 is an example block diagram illustrating an architecture of a computer system that executes a Content Inserter application and/or a Content Inserter process according to embodiments herein.

In another embodiment, the aspects illustrated in FIG. 5 and throughout can be applied with respect to keyframes. For example, for each region 440, 450, 460, the Content Inserter 150 identifies a number of keyframes. The Content Inserter 150 therefore identifies which region 440, 450, 460 has the most number of keyframes. The region with the most number of keyframes is therefore a region where the video frames appear to be changing most often. The region with the most number of keyframes is, therefore, the region with the highest activity level—which is best suited for placement of secondary content 240.

FIG. 5 is an example block diagram illustrating an architecture of a computer system 110 that executes, runs, interprets, operates or otherwise performs a Content Inserter application 150-1 and/or Content Inserter process 150-2 (e.g. an executing version of a Content Inserter 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Content Inserter 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Content Inserter application 150-1 and/or the Content Inserter process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Content Inserter application 150-1. Execution of the Content Inserter application 150-1 in this manner produces the Content Inserter process 150-2. In other words, the Content Inserter process 150-2 represents one or more portions or runtime instances of the Content Inserter application 150-1 (or the entire application 150-1) performing or executing within or upon the processor 113 in the computerized device 110 at runtime.

The Content Inserter application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Content Inserter application 150-1 can be executed on a remotely accessible computerized device via the communication interface 115.

FIG. 6 through FIG. 12 illustrate various embodiment of the Content Inserter 150. The rectangular elements in flowcharts 700, 800, 900, 1000, 1100, 1200 and 1300 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 700, 800, 900, 1000, 1100, 1200 and 1300 do not necessarily depict the syntax of any particular programming language. Rather, flowcharts 700, 800, 900, 1000, 1100, 1200 and 1300 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 6:
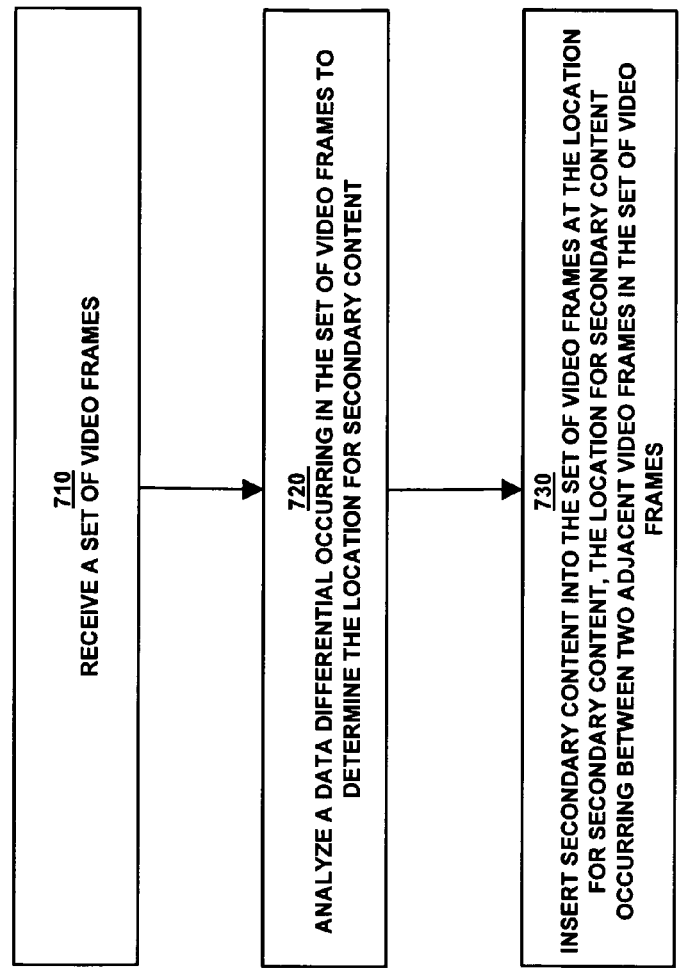
FIG. 6 is a flowchart of an example of processing steps performed by the Content Inserter to analyze a data differential occurring in a set of video frames according to embodiments herein.

FIG. 6 is a flowchart 700 of an example of processing steps performed by the Content Inserter 150 to analyze a data differential occurring in a set of video frames 210 according to embodiments herein.

At step 710, the Content Inserter 150 receives a set of video frames 210 and can receive metadata associated with the content of the set of video frames 210.

At step 720, the Content Inserter 150 analyzes a data differential(s) occurring in the set of video frames 210 to determine a location(s) 230-1 . . . 230-3 for secondary content 240. Thus, in one embodiment, 5the Content Inserter 150 detects changes in the metadata, the changes in the metadata indicating a change in the content of the set of video frames 210.

At step 730, the Content Inserter 150 inserts secondary content 240 into the set of video frames 210 at a location(s) 230-1 . . . 230-3 for secondary content 240, the location(s) 230-1 . . . 230-3 for secondary content 240 occurs between two adjacent video frames in the set of video frames 210.

Figure 7:
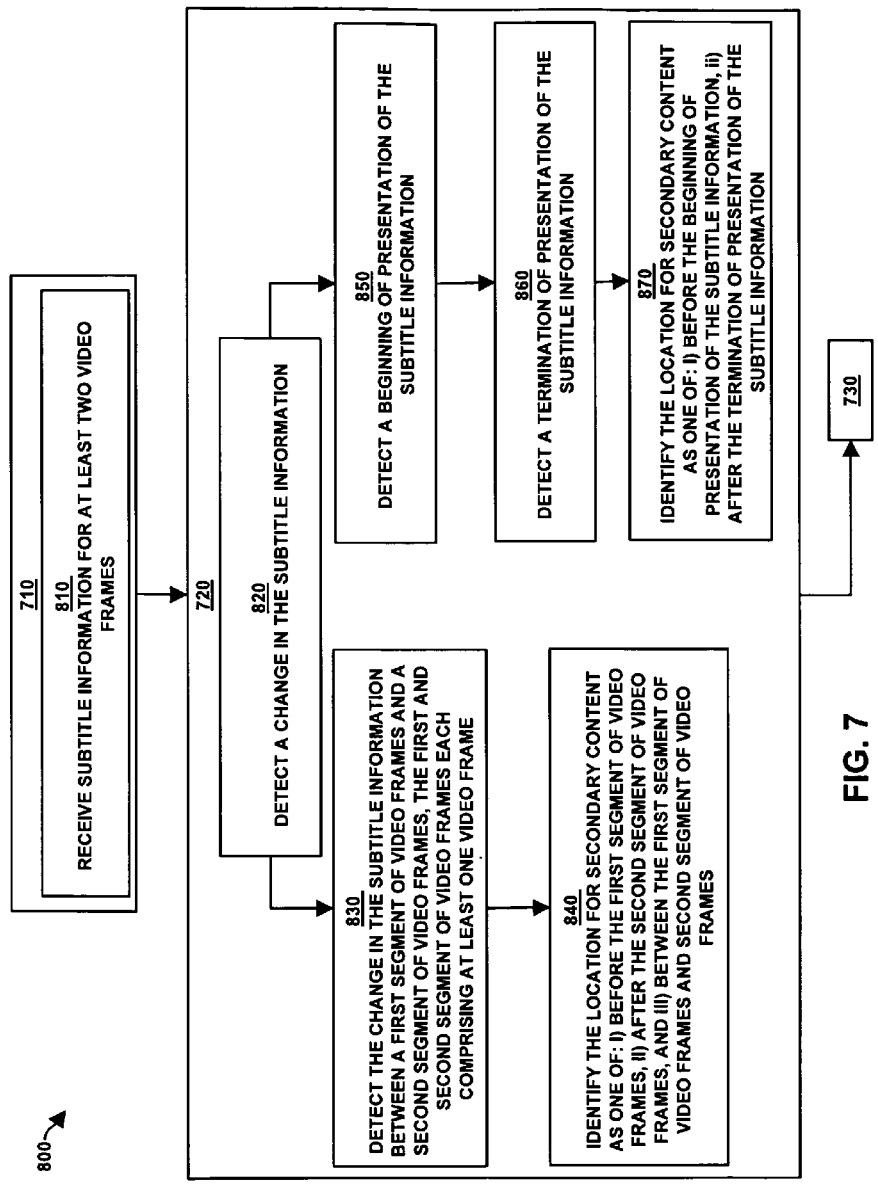
FIG. 7 is a flowchart of an example of processing steps performed by the Content Inserter to detect a change in subtitle information according to embodiments herein.

FIG. 7 is a flowchart 800 of an example of processing steps performed by the Content Inserter 150 to detect a change in subtitle information 220 according to embodiments herein. It is understood that the with regard to FIG. 7, the Content Inserter 150 performs steps 830-840 or steps 850-870.

At step 810, the Content Inserter 150 receives subtitle information 220-8, 220-9 for at least two video frames 210-8, 210-9.

At step 820, the Content Inserter 150 detects a change in the subtitle information 220.

At step 830, the Content Inserter 150 detects the change in the subtitle information 220 between a first segment of video frames and a second segment of video frames. It is understood that the first and second segment of video frames each comprising at least one video frame, such as the seventh and eighth video frames 210-7, 210-8, respectively.

At step 840, the Content Inserter 150 identifies the location 230-4, 230-5 for secondary content 240 as one of: i) before the first segment of video frames (such as location 230-4), ii) after the second segment of video frames (such as location 230-5) and iii) between the first segment of video frames and second segment of video frames (such as between the eighth and ninth video frames 210-8, 210-9).

In the alternative, independent of steps 830-840, in order determine the secondary content locations 230-4, 230-5, at step 850, the Content Inserter 150 detects a beginning of presentation of the subtitle information—such as the subtitle information 220-8 associated with the eighth video frame 210-8.

At step 860, the Content Inserter 150 detects a termination of presentation of the subtitle information—such as the subtitle information 220-9 associated with the ninth video frame 210-9.

At step 870, the Content Inserter 150 identifies the location 230-4, 230-5 for secondary content 240 as one of: a) before the beginning of presentation of the subtitle information, and b) after the termination of presentation of the subtitle information.

Figure 8:
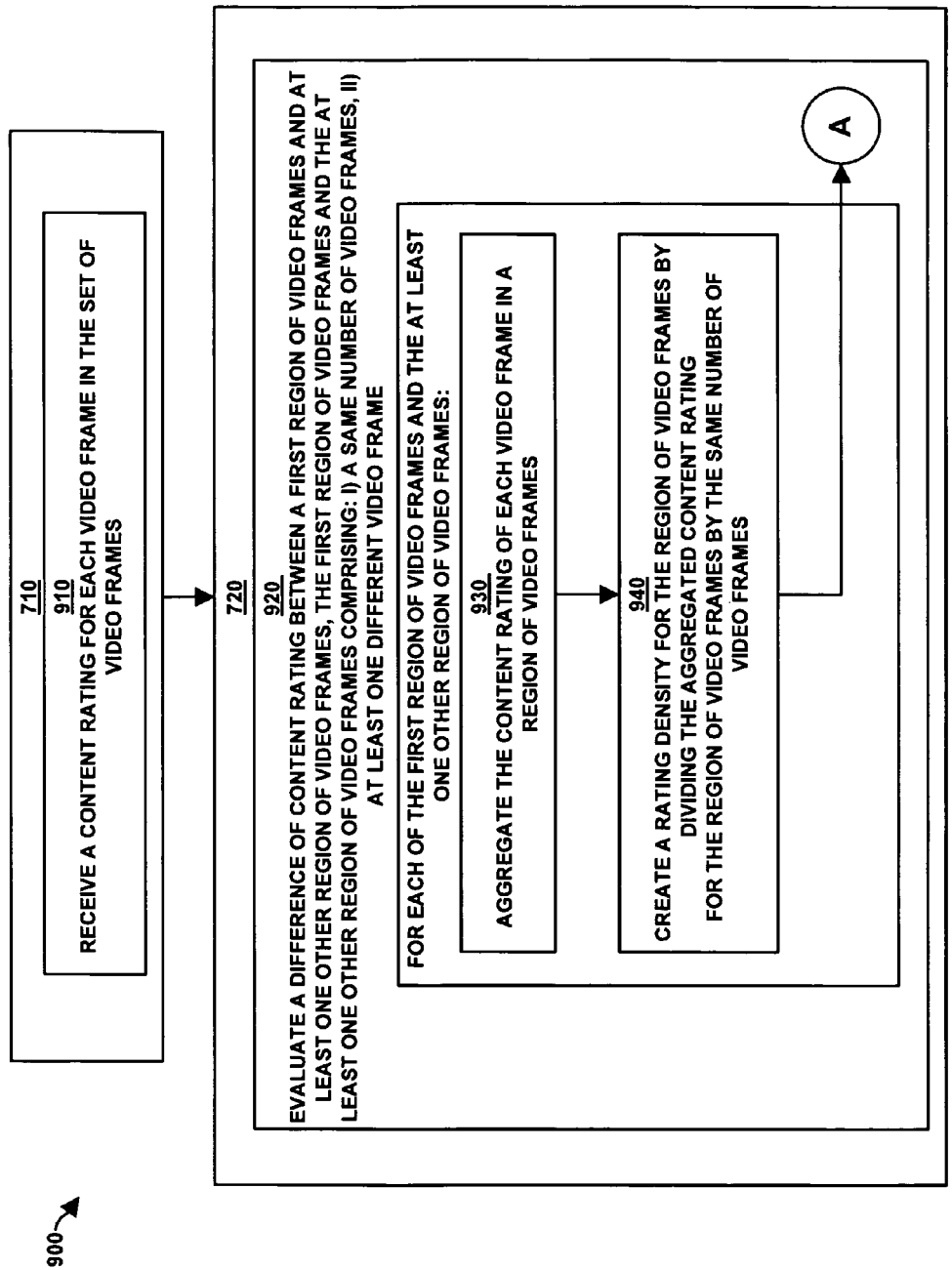
FIGS. 8-9 are flowcharts of an example of processing steps performed by the Content Inserter to evaluate a difference of content rating between regions of video frames according to embodiments herein.
Figure 9:
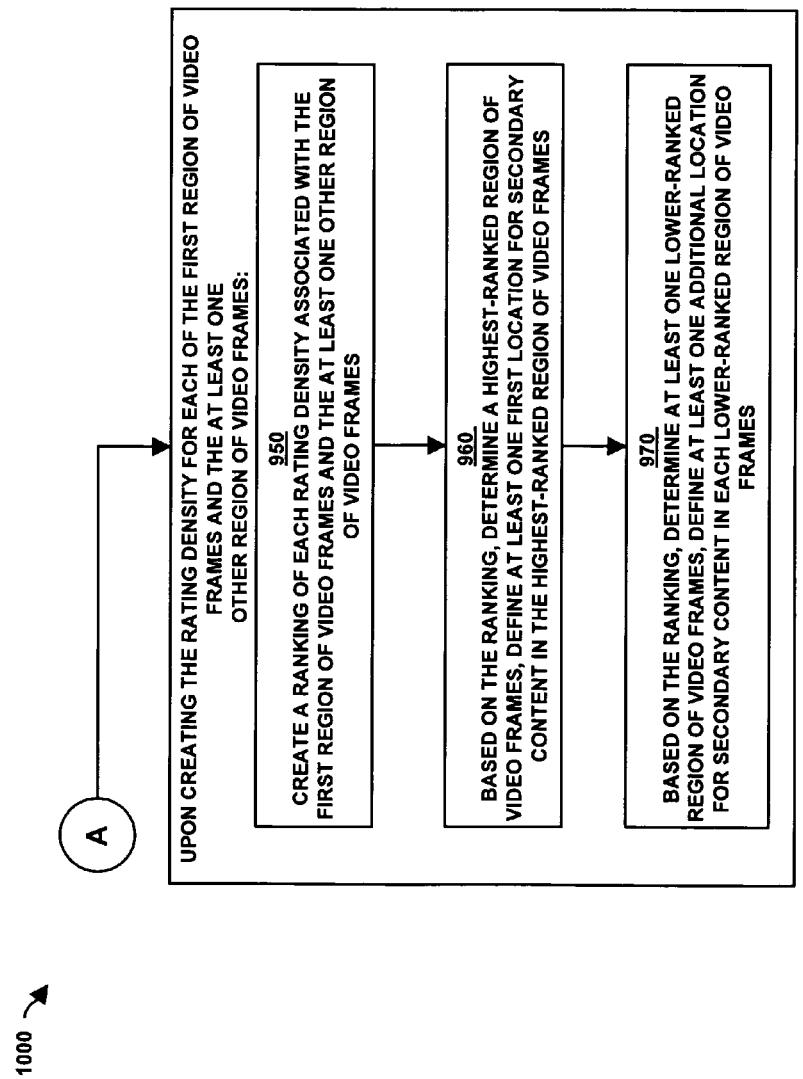

FIGS. 8-9 are flowcharts 900, 1000 of an example of processing steps performed by the Content Inserter 150 to evaluate a difference of content rating 320 between regions of video frames 330, 340, 350 according to embodiments herein.

At step 910, the Content Inserter 150 receives a content rating 320 for each video frame in the set of video frames 310.

At step 920, the Content Inserter 150 evaluates a difference of content rating between the regions of video frames 330, 340, 350. The regions of video frames 330, 340, 350 each have the same number of video frames but at least one different video frame.

At step 930, for each of the regions of video frames 330, 340, 350, the Content Inserter 150 aggregates the content rating 320 of each video frame.

At step 940, the Content Inserter 150 creates a rating density 330-1, 340-1, 350-1 for the regions of video frames 330, 340, 350 by dividing each region's 330, 340, 350 aggregated content rating by the number of video frames per region.

Turning now to FIG. 9, upon creating the rating density 330-1, 340-1, 350-1 for the regions of video frames 330, 340, 350, at step 950, the Content Inserter 150 creates a ranking of each rating density 330-1, 340-1, 350-1.

At step 960, based on the ranking, the Content Inserter 150 determines a highest-ranked region of video frames and defines a location(s) for secondary content 240 in the highest-ranked region of video frames.

At step 970, based on the ranking, the Content Inserter 150 determines a lower-ranked region(s) of video frames and defines an additional location(s) for secondary content 240 in the lower-ranked region(s) of video frames.

Figure 10:
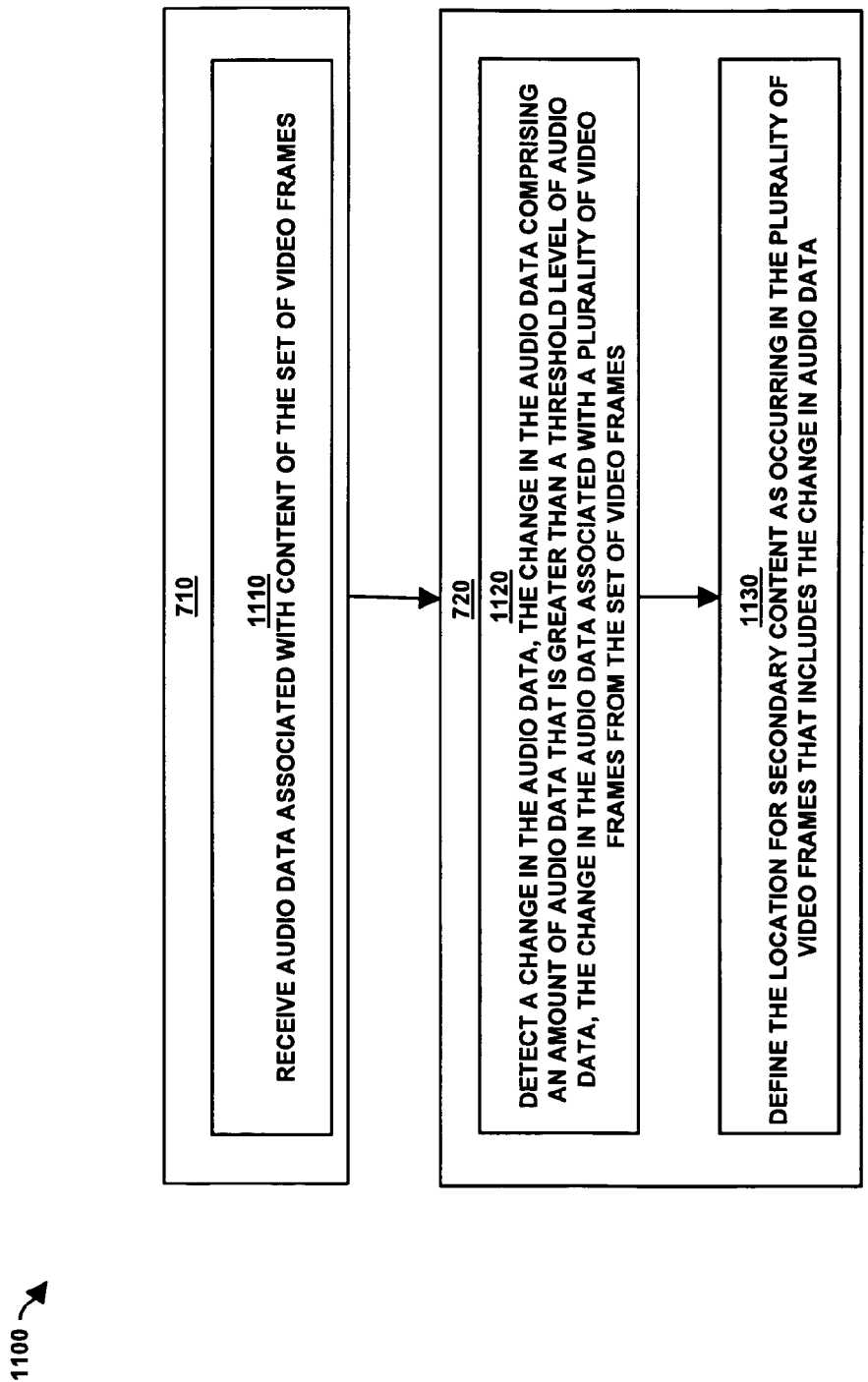
FIG. 10 is a flowchart of an example of processing steps performed by the Content Inserter to detect a change in audio data according to embodiments herein.

FIG. 10 is a flowchart 1100 of an example of processing steps performed by the Content Inserter 150 to detect a change in audio data according to embodiments herein.

At step 1110, the Content Inserter 150 receives audio data associated with content of the set of video frames 210.

At step 1120, the Content Inserter 150 detects a change in the audio data, where the change in audio data reflects an amount of audio data, associated with a plurality of video frames, that is greater than a threshold level of audio data.

At step 1130, the Content Inserter 150 defines the location for secondary content 240 as occurring in the plurality of video frames that includes the change in audio data.

Figure 11:
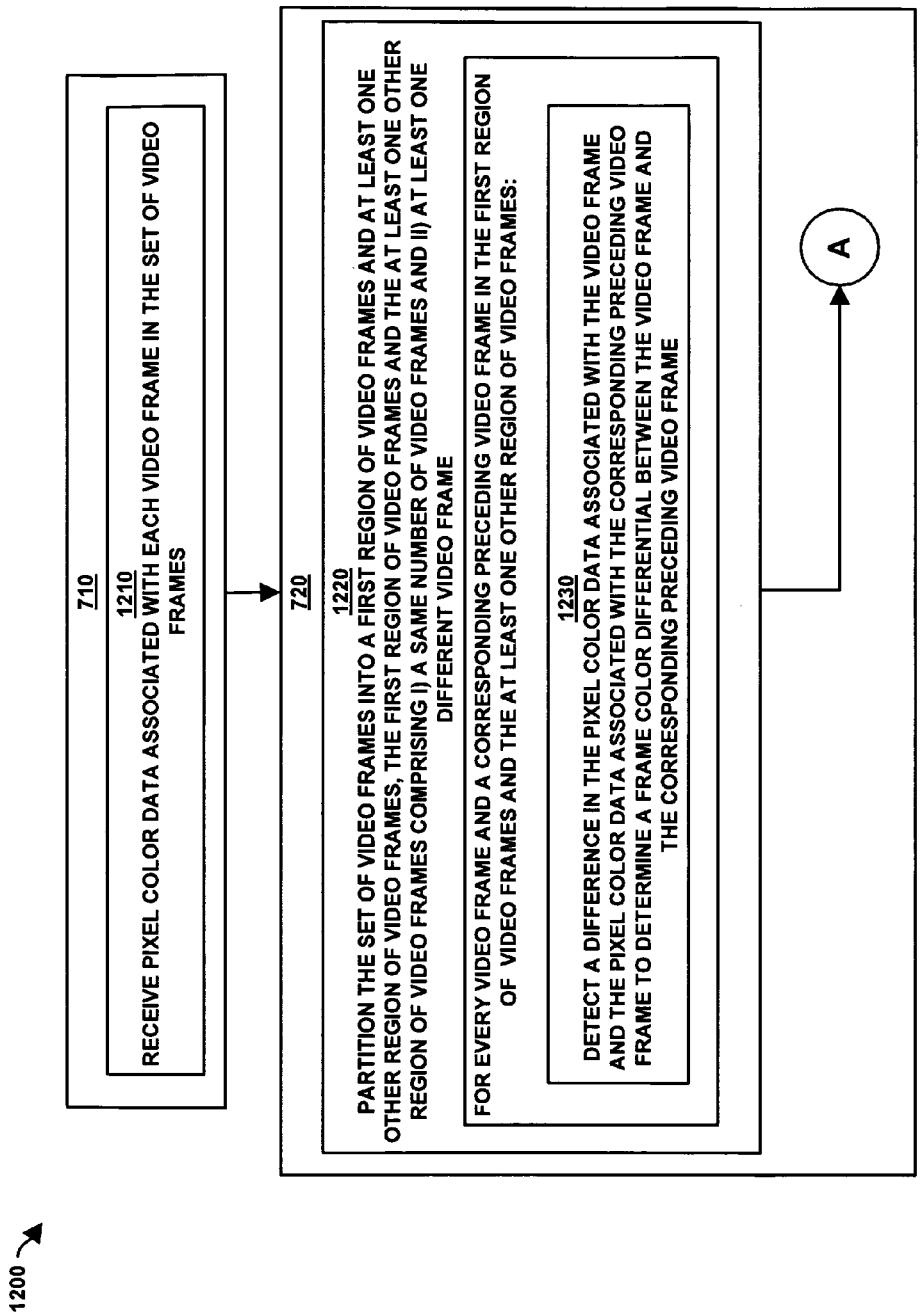
FIGS. 11-12 are flowcharts of an example of processing steps performed by the Content Inserter to detect activity levels in video frames according to embodiments herein.
Figure 12:
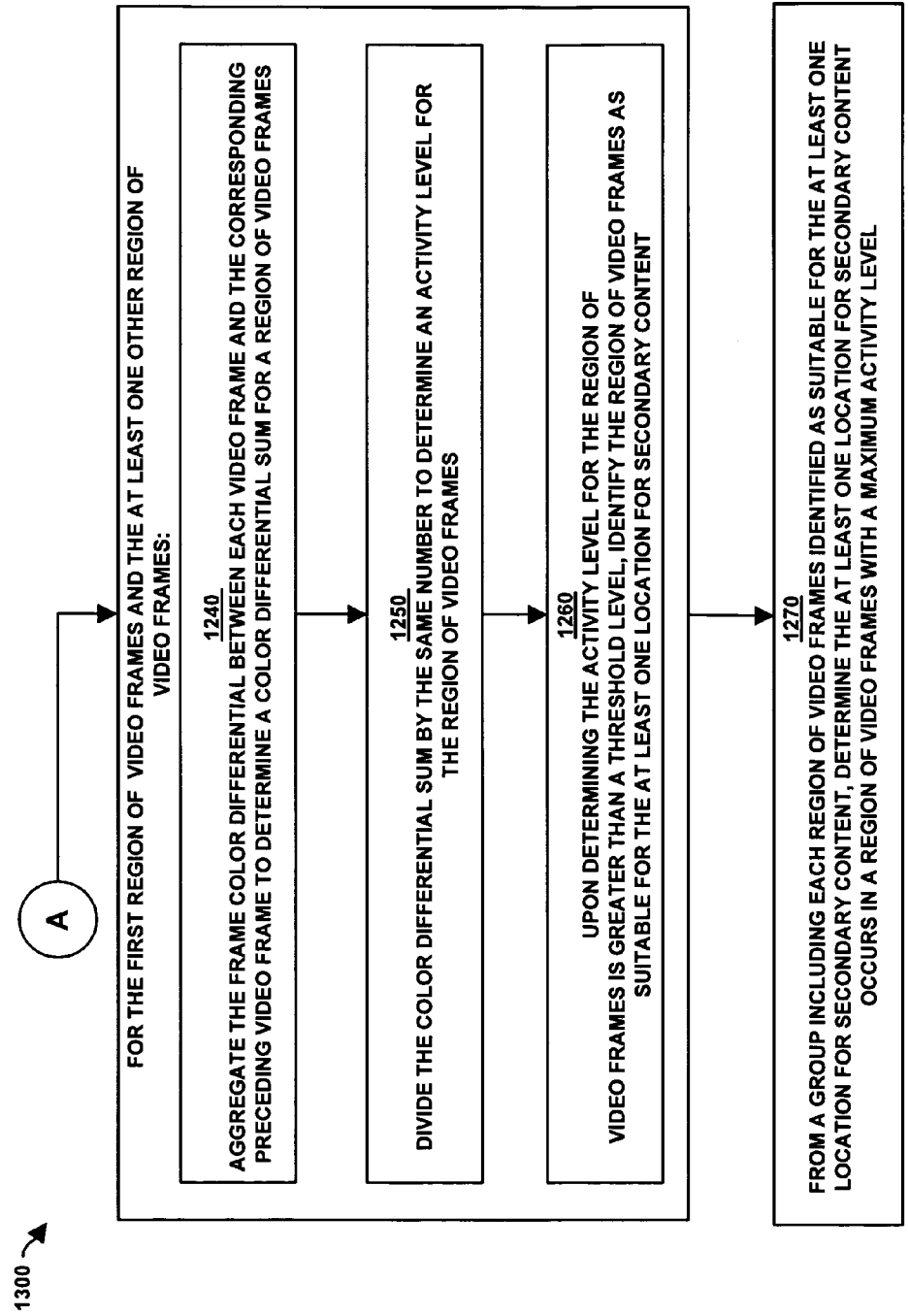

FIGS. 11-12 are flowcharts 1200, 1300 of an example of processing steps performed by the Content Inserter 150 to detect activity levels 440-1, 450-1, 460-1 in video frames according to embodiments herein.

At step 1210, the Content Inserter 150 receives pixel color data 420 associated with each video frame in a set of video frames 410.

At step 1220, the Content Inserter 150 partitions the set of video frames 410 into regions 440, 450, 460 of video frames, where each region 440, 450, 460 has the same number of video frames but at least one different video frame.

For every video frame and a corresponding preceding video frame in each region 440, 450, 460: at step 1230, the Content Inserter 150 detects a difference in the pixel color data associated with a video frame (e.g. video frame 410-2) and the pixel color data associated with a corresponding preceding video frame (e.g. video frame 410-1) to determine a frame color differential 430 between the video frame and the corresponding preceding video frame (e.g. frame color differential 430-1).

At FIG. 12, for each region 440, 450, 460, at step 1240, the Content Inserter 150 aggregates the frame color differential between each video frame its corresponding preceding video frame to determine a color differential sum for a region of video frames. For example, for region 450, the Content Inserter 150 aggregates four frame color differentials 430-2, 430-3, 430-4, 430-5.

At step 1250, the Content Inserter 150 divides the color differential sum (e.g. frame color differential 430-2+frame color differential 430-3+frame color differential 430-4+frame color differential 430-5) by the number of video frames per region to determine an activity level 440-1, 450-1, 460-1 for the regions 440, 450, 460 of video frames.

At step 1260, if any of the activity levels 440-1, 450-1, 460-1 for each region 440, 450, 460 is greater than a threshold level, the Content Inserter 150 identifies the region 440, 450, 460 of video frames as suitable for a location(s) for secondary content 240. For example, if the activity level 440-1 for the first region 440 of video frames is greater than the threshold level, then the Content Inserter 150 identifies the first region 440 as suitable for a location(s) of secondary content 240.

At step 1270, from a group of regions of video frames that have been identified as suitable for a location(s) for secondary content 240, the Content Inserter 150 determines that the location(s) for secondary content 240 occurs in a region of video frames that has a maximum activity level.

Note again that techniques herein are well suited for a Content Inserter 150 that to allows for determining a location(s) in a set of video frames 210, 310, 410 for secondary content 240 based on characteristics of the content of the set of video frames 210. By analyzing metadata, subtitle information 220, audio data, content ratings 320 and/or pixel color data 420 related to the video frames in the set of video frames 210, 310, 410 the Content Inserter 150 determines locations 230 for secondary content 240 that correlate to moments in set's 210, 310, 410 content that capture a viewer's attention.

Thus, by inserting secondary content 240 (e.g advertisements) with respect to moments in the set's 210, 310, 410 content that capture the viewer's attention, the Content Inserter 150 ensures that the viewer will most likely be willing to actually view the secondary content 240.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
receiving, at a computerized system, a set of video frames, wherein receiving the set of video frames includes receiving metadata associated with content of the set of video frames, wherein receiving metadata associated with content of the set of video frames includes receiving a content rating for each video frame in the set of video frames, the content rating providing past viewer reaction for each video frame;
analyzing, by the computer system performing logic instructions, at least one data differential occurring in the set of video frames to determine at least one location for secondary content, wherein analyzing the at least one data differential comprises detecting at least one change in the metadata, the at least one change in the metadata indicating a change in the content, wherein detecting the at least one change in the metadata includes evaluating a difference of content rating between a first region of video frames and at least one other region of video frames, the first region of video frames and the at least one other region of video frames comprising:
 i) a same number of video frames; and
 ii) at least one different video frame;
associating, at the computer system, secondary content at the at least one location for secondary content, the at least one location for secondary content positioned between two adjacent video frames in the set of video frames.

2. The method as in claim 1, wherein:
receiving metadata associated with content of the set of video frames includes receiving subtitle information for at least two video frames; and
wherein detecting the at least one change in the metadata includes detecting at least one change in the subtitle information.

3. The method as in claim 2, wherein detecting the at least one change in the subtitle information includes:
detecting the at least one change in the subtitle information between a first segment of video frames and a second segment of video frames, the first and second segment of video frames each comprising at least one video frame;
identifying the at least one location for secondary content as one of:
 i) before the first segment of video frames;
 ii) after the second segment of video frames; and
 iii) between the first segment of video frames and second segment of video frames.

4. The method as in claim 2, wherein detecting the at least one change in the subtitle information includes:
detecting at least one beginning of presentation of the subtitle information;
detecting at least one termination of presentation of the subtitle information;
identifying the at least one location for secondary content as one of:
 i) before the at least one beginning of presentation of the subtitle information; and
 ii) after the at least one termination of presentation of the subtitle information.

5. The method as in claim 1, wherein evaluating the difference of content rating between the first region of video frames and the at least one other region of video frames includes:
for each of the first region of video frames and the at least one other region of video frames:
 aggregating the content rating of each video frame in a region of video frames; and
 creating a rating density for the region of video frames by dividing the aggregated content rating for the region of video frames by the same number of video frames.

6. The method as in claim 5, further comprising:
upon creating the rating density for each of the first region of video frames and the at least one other region of video frames:
 creating a ranking of each rating density associated with the first region of video frames and the at least one other region of video frames;
 based on the ranking, determining a highest-ranked region of video frames, defining at least one first location for secondary content in the highest-ranked region of video frames; and
 based on the ranking, determining at least one lower-ranked region of video frames, defining at least one additional location for secondary content in each lower-ranked region of video frames.

7. The method as in claim 6, wherein associating secondary content at the at least one location for secondary content includes:
inserting secondary content with respect to the at least one first location for secondary content in the highest-ranked region of video frames, an amount of secondary content inserted with respect to the at least one first location for secondary content proportionally determined according to a ratio between a rating density associated with the highest-ranked region of video frames and a rating density for each lower-ranked region; and for each lower-ranked region of video frames:
inserting secondary content with respect to the at least one additional location for secondary content in the lower-ranked region of video frames; an amount of secondary content inserted with respect to the at least one additional location for secondary content proportionally determined according to the ratio between the rating density associated with the highest-ranked region of video frames and the rating density for each lower-ranked region.

8. The method as in claim 1, further comprising:
wherein receiving the set of video frames includes receiving audio data associated with content of the set of video frames;
wherein analyzing the at least one data differential occurring in the set of video frames to determine the at least one location for secondary content includes:
detecting at least one change in the audio data, the at least one change in the audio data comprising an amount of audio data that is greater than a threshold level of audio data, the at least one change in the audio data associated with a plurality of video frames from the set of video frames; and
defining the at least one location for secondary content as occurring in the plurality of video frames that includes the at least one change in audio data.

9. The method as in claim 1, further comprising:
wherein receiving the set of video frames includes receiving pixel color data associated with each video frame in the set of video frames;
wherein analyzing at least one data differential occurring in the set of video frames to determine at least one location for secondary content includes:
partitioning the set of video frames into a first region of video frames and at least one other region of video frames, the first region of video frames and the at least one other region of video frames comprising i) a same number of video frames and ii) at least one different video frame; and
for every video frame and a corresponding preceding video frame in the first region of video frames and the at least one other region of video frames:
detecting a difference in the pixel color data associated with the video frame and the pixel color data associated with the corresponding preceding video frame to determine a frame color differential between the video frame and the corresponding preceding video frame.

10. The method as in claim 9, further comprising:
for the first region of video frames and the at least one other region of video frames:
aggregating the frame color differential between each video frame and the corresponding preceding video frame to determine a color differential sum for a region of video frames;
dividing the color differential sum by a same number to determine an activity level for the region of video frames; and
upon determining the activity level for the region of video frames is greater than a threshold level, identifying the region of video frames as suitable for the at least one location for secondary content; and
from a group including each region of video frames identified as suitable for the at least one location for secondary content, determining the at least one location for secondary content occurs in a region of video frames with a maximum activity level.

11. A non-transitory computer readable medium comprising executable instructions encoded thereon operable on a computerized device to perform processing comprising:
instructions for receiving a set of video frames, wherein receiving the set of video frames includes receiving metadata associated with content of the set of video frames, wherein the instructions for receiving metadata associated with content of the set of video frames include instructions for receiving a content rating for each video frame in the set of video frames, the content rating providing past viewer reaction for each video frame;
instructions for analyzing at least one data differential occurring in the set of video frames to determine at least one location for secondary content, wherein analyzing the at least one data differential comprises detecting at least one change in the metadata, the at least one change in the metadata indicating a change in the content, wherein the instructions for detecting the at least one change in the metadata include instructions for evaluating a difference of content rating between a first region of video frames and at least one other region of video frames, the first region of video frames and the at least one other region of video frames comprising:
i) a same number of video frames; and
ii) at least one different video frame;
instructions for inserting secondary content into the set of video frames at the at least one location for secondary content, the at least one location for secondary content occurring between two adjacent video frames in the set of video frames.

12. The non-transitory computer readable medium as in claim 11, further comprising:
wherein the instructions for receiving metadata associated with content of the set of video frames include instructions for receiving subtitle information for at least two video frames; and
wherein the instructions for detecting the at least one change in the metadata include instructions for detecting at least one change in the subtitle information.

13. The non-transitory computer readable medium as in claim 12, wherein the instructions for detecting the at least one change in the subtitle information include:
instructions for detecting the at least one change in the subtitle information between a first segment of video frames and a second segment of video frames, the first and second segment of video frames each comprising at least one video frame;
instructions for identifying the at least one location for secondary content as one of:
i) before the first segment of video frames;
ii) after the second segment of video frames; and
iii) between the first segment of video frames and second segment of video frames.

14. The non-transitory computer readable medium as in claim 12, wherein the instructions for detecting the at least one change in the subtitle information include:
instructions for detecting at least one beginning of presentation of the subtitle information;

instructions for detecting at least one termination of presentation of the subtitle information;
instructions for identifying the at least one location for secondary content as one of:
  i) before the at least one beginning of presentation of the subtitle information; and
  ii) after the at least one termination of presentation of the subtitle information.

15. The non-transitory computer readable medium as in claim 11, wherein the instructions for evaluating the difference of content rating between the first region of video frames and the at least one other region of video frames include:
for each of the first region of video frames and the at least one other region of video frames:
  instructions for aggregating the content rating of each video frame in a region of video frames; and
  instructions for creating a rating density for the region of video frames by dividing the aggregated content rating for the region of video frames by the same number of video frames.

16. The non-transitory computer readable medium as in claim 15, further comprising:
upon creating the rating density for each of the first region of video frames and the at least one other region of video frames:
  instructions for creating a ranking of each rating density associated with the first region of video frames and the at least one other region of video frames;
  based on the ranking, instructions for determining a highest-ranked region of video frames, defining at least one first location for secondary content in the highest-ranked region of video frames; and
  based on the ranking, instructions for determining at least one lower-ranked region of video frames, defining at least one additional location for secondary content in each lower-ranked region of video frames.

17. The non-transitory computer readable medium as in claim 16, wherein the instructions for inserting secondary content into the set of video frames at the at least one location for secondary content include:
  instructions for inserting secondary content into the at least one first location for secondary content in the highest-ranked region of video frames, an amount of secondary content inserted into the at least one first location for secondary content proportionally determined according to a ratio between a rating density associated with the highest-ranked region of video frames and a rating density for each lower-ranked region; and
  for each lower-ranked region of video frames:
    instructions for inserting secondary content into the at least one additional location for secondary content in the lower-ranked region of video frames; an amount of secondary content inserted into the at least one additional location for secondary content proportionally determined according to the ratio between the rating density associated with the highest-ranked region of video frames and the rating density for each lower-ranked region.

18. The non-transitory computer readable medium as in claim 11, further comprising:
wherein the instructions for receiving the set of video frames include instructions for receiving audio data associated with content of the set of video frames;
wherein the instructions for analyzing the at least one data differential occurring in the set of video frames to determine the at least one location for secondary content include:
  instructions for detecting at least one change in the audio data, the at least one change in the audio data comprising an amount of audio data that is greater than a threshold level of audio data, the at least one change in the audio data associated with a plurality of video frames from the set of video frames; and
  instructions for defining the at least one location for secondary content as occurring in the plurality of video frames that includes the at least one change in audio data.

19. The non-transitory computer readable medium as in claim 11, further comprising:
wherein the instructions for receiving the set of video frames include instructions for receiving pixel color data associated with each video frame in the set of video frames;
wherein the instructions for analyzing at least one data differential occurring in the set of video frames to determine at least one location for secondary content include:
  instructions for partitioning the set of video frames into a first region of video frames and at least one other region of video frames, the first region of video frames and the at least one other region of video frames comprising i) a same number of video frames and ii) at least one different video frame; and
  for every video frame and a corresponding preceding video frame in the first region of video frames and the at least one other region of video frames:
    instructions for detecting a difference in the pixel color data associated with the video frame and the pixel color data associated with the corresponding preceding video frame to determine a frame color differential between the video frame and the corresponding preceding video frame.

20. The non-transitory computer readable medium as in claim 19, further comprising:
for the first region of video frames and the at least one other region of video frames:
  instructions for aggregating the frame color differential between each video frame and the corresponding preceding video frame to determine a color differential sum for a region of video frames;
  instructions for dividing the color differential sum by the same number to determine an activity level for the region of video frames; and
  upon determining the activity level for the region of video frames is greater than a threshold level, instructions for identifying the region of video frames as suitable for the at least one location for secondary content; and
  from a group including each region of video frames identified as suitable for the at least one location for secondary content, instructions for determining the at least one location for secondary content occurs in a region of video frames with a maximum activity level.

21. The non-transitory computer readable medium as in claim 12, wherein the instructions for detecting the at least one change in the subtitle information includes:
  instructions for partitioning the set of video frames into a first region of video frames and at least one other region of video frames, the first region of video frames and the at least one other region of video frames comprising i) a same number of video frames and ii) at least one different video frame; and
  for each of the first region of video frames and the at least one other region of video frames:

instructions for aggregating the subtitle information of each video frame in a region of video frames;

instructions for creating a subtitle density for the region of video frames by dividing the aggregated subtitle information for the region of video frames by the same number of video frames.

22. The non-transitory computer readable medium as in claim 21, further comprising:

upon creating the subtitle density for each of the first region of video frames and the at least one other region of video frames:

instructions for creating a ranking of each subtitle density associated with the first region of video frames and the at least one other region of video frames;

instructions for determining a highest-ranked region of video frames and defining at least one first location for secondary content in the highest-ranked region of video frames based on the ranking, the at least one first location for secondary content proportionally determined according to a ratio between a subtitle density associated with the highest-ranked region of video frames and a subtitle density for each lower-ranked region; and instructions for determining at least one lower-ranked region of video frames based on the ranking and defining at least one additional location for secondary content in each lower-ranked region of video frames according to the ratio.

23. A computer system comprising:

a processor;

a memory unit that stores instructions associated with an application executed by the processor; and an interconnect coupling the processor and the memory unit, enabling the computer system to execute the application and perform operations of:

receiving a set of video frames, wherein receiving the set of video frames includes receiving metadata associated with content of the set of video frames, wherein receiving metadata associated with content of the set of video frames includes receiving a content rating for each video frame in the set of video frames, the content rating providing past viewer reaction for each video frame;

analyzing at least one data differential occurring in the set of video frames to determine at least one location for secondary content, wherein analyzing the at least one data differential comprises detecting at least one change in the metadata, the at least one change in the metadata indicating a change in the content, wherein detecting the at least one change in the metadata includes evaluating a difference of content rating between a first region of video frames and at least one other region of video frames, the first region of video frames and the at least one other region of video frames comprising:

i) a same number of video frames; and ii) at least one different video frame;

inserting secondary content into the set of video frames at the at least one location for secondary content, the at least one location for secondary content occurring between two adjacent video frames in the set of video frames.

* * * * *